US011150752B2

(12) United States Patent
Kim et al.

(10) Patent No.: US 11,150,752 B2
(45) Date of Patent: Oct. 19, 2021

(54) DISPLAY DEVICE AND PORTABLE DEVICE INCLUDING THE SAME

(71) Applicant: Samsung Display Co., Ltd., Yongin-Si (KR)

(72) Inventors: Sungmin Kim, Yongin-si (KR); Jaelok Cha, Gyeonggi-do (KR)

(73) Assignee: Samsung Display Co., Ltd.

( * ) Notice: Subject to any disclaimer, the term of this patent is extended or adjusted under 35 U.S.C. 154(b) by 107 days.

(21) Appl. No.: 16/511,028

(22) Filed: Jul. 15, 2019

(65) Prior Publication Data

US 2020/0133407 A1 Apr. 30, 2020

(30) Foreign Application Priority Data

Oct. 31, 2018 (KR) .................. 10-2018-0132295

(51) Int. Cl.
*G06F 3/0354* (2013.01)
*G06F 3/038* (2013.01)
*G06K 9/00* (2006.01)

(52) U.S. Cl.
CPC ........ *G06F 3/0383* (2013.01); *G06F 3/03545* (2013.01); *G06K 9/00013* (2013.01); *G06F 2203/0382* (2013.01)

(58) Field of Classification Search
None
See application file for complete search history.

(56) References Cited

U.S. PATENT DOCUMENTS

| | | | |
|---|---|---|---|
| 9,961,178 B2 | 5/2018 | Hong | |
| 2016/0098110 A1 | 4/2016 | Choi et al. | |
| 2017/0045918 A1* | 2/2017 | Han | ............ G02F 1/13318 |
| 2017/0270342 A1 | 9/2017 | He et al. | |
| 2017/0289805 A1 | 10/2017 | Hong | |
| 2017/0300736 A1* | 10/2017 | Song | ............ G06K 9/0004 |
| 2018/0012069 A1 | 1/2018 | Chung et al. | |
| 2018/0076412 A1* | 3/2018 | Kim | ............ H01L 51/56 |
| 2018/0151641 A1* | 5/2018 | Choo | ............ G06F 1/1643 |
| 2018/0184523 A1* | 6/2018 | Yoo | ............ H05K 1/147 |
| 2018/0203483 A1 | 7/2018 | Kwak et al. | |
| 2018/0204526 A1 | 7/2018 | Heo et al. | |
| 2018/0365475 A1* | 12/2018 | Lee | ............ H05K 1/0274 |
| 2019/0014402 A1 | 1/2019 | Ahn et al. | |

(Continued)

FOREIGN PATENT DOCUMENTS

KR 10-2016-0039767 A 4/2016
KR 10-2017-0106425 A 9/2017
(Continued)

*Primary Examiner* — Kent W Chang
*Assistant Examiner* — Benjamin Morales
(74) *Attorney, Agent, or Firm* — Innovation Counsel LLP

(57) ABSTRACT

Provided is a display device including a base substrate including a display area and a non-display area adjacent to the display area, a display element layer disposed on an upper portion of the base substrate, a sensor part disposed on a lower portion of the base substrate, and a sensing circuit board disposed on the lower portion of the base substrate and generating an electric field in response to an input from outside. The sensing circuit board includes a main board including a first opening part exposing the sensor part, and an auxiliary board overlapping the sensor part, disposed on the main board, and electrically connected to the main board.

20 Claims, 10 Drawing Sheets

(56) References Cited

U.S. PATENT DOCUMENTS

| | | | |
|---|---|---|---|
| 2019/0073505 A1* | 3/2019 | Kwon | H05K 1/0203 |
| 2019/0087630 A1* | 3/2019 | Seo | G06K 9/0012 |
| 2019/0147214 A1* | 5/2019 | Lee | H01L 51/5246 |
| | | | 382/124 |

FOREIGN PATENT DOCUMENTS

| KR | 10-2017-0113158 A | 10/2017 |
|---|---|---|
| KR | 10-2017-0113361 A | 10/2017 |
| KR | 10-2017-0123578 A | 11/2017 |
| KR | 10-2018-0005588 A | 1/2018 |
| KR | 10-2018-0085423 A | 7/2018 |
| KR | 10-2018-0085627 A | 7/2018 |
| KR | 10-2019-0006113 A | 1/2019 |

* cited by examiner

DISPLAY DEVICE AND PORTABLE DEVICE INCLUDING THE SAME

CROSS-REFERENCE TO RELATED APPLICATIONS

This U.S. non-provisional patent application claims priority under 35 U.S.C. § 119 to Korean Patent Application No. 10-2018-0132295, filed on Oct. 31, 2018, the entire contents of which are hereby incorporated by reference.

BACKGROUND

The present disclosure herein relates to a display device and a portable device including the same.

Various display devices, which are used in a multi-media device such as a television, a mobile phone, a tablet computer, a navigator, or a game player, are being developed.

A display device may include a display panel on which an image is displayed and an input sensor part which senses an external input. The display panel includes a display area on which an image is displayed and a non-display area disposed around the display area. Nowadays, a display device for reducing the non-display area and enlarging the display area is being developed. In this case, as the non-display area of the display device becomes reduced, driving components having been disposed in the non-display area may be disposed to overlap the display area. For example, a display device including a fingerprint recognition sensor which overlaps the display area is being developed.

In addition, the display device may be operated using an external touch pen. The display device may include an activation region corresponding to the display area, and sense an input signal from the touch pen through the activation region.

SUMMARY

The present disclosure provides a display device in which sensing reliability of a touch pen may be improved and a portable device including the same.

An embodiment of the inventive concept provides a display device including: a base substrate including a display area and a non-display area adjacent to the display area; a display element layer disposed on an upper portion of the base substrate; a sensor part disposed on a lower portion of the base substrate; and a sensing circuit board disposed on the lower portion of the base substrate and generating an electric field in response to an input from outside, the sensing circuit board including: a main board including a first opening part exposing the sensor part; and an auxiliary board overlapping the sensor part, disposed on the main board, and electrically connected to the main board.

In an embodiment, the distance from the base substrate to an upper surface of the main board may be shorter than the distance from the base substrate to a lower surface of the auxiliary board in the thickness direction of the base substrate.

In an embodiment, the main board may include a first portion which includes a first main pad and a second main pad disposed on the first portion and separated with the first opening part interposed therebetween in one direction, and the auxiliary board may include a first auxiliary pad and a second auxiliary pad disposed on the auxiliary board, wherein the first main pad is connected to the first auxiliary pad, and the second main pad is connected to the second auxiliary pad.

In an embodiment, the main board may further include a third main pad and a fourth main pad disposed on the first portion and separated with the first opening part interposed therebetween in another direction that is perpendicular to the one direction, and the auxiliary board may include a third auxiliary pad and a fourth auxiliary pad disposed on the auxiliary board, wherein the third main pad is connected to the third auxiliary pad, and the fourth main pad is connected to the fourth auxiliary pad.

In an embodiment, the display device may further include a driving circuit board configured to provide a driving signal to the display element layer and disposed on the main board.

In an embodiment, the display device may further include a connector disposed on the main board and connecting the driving circuit board and the auxiliary board, wherein the driving circuit board receives a sensing signal through the connector, and transfers the sensing signal to the main board.

In an embodiment, the auxiliary board and the connector may be provided in an integrated shape.

In an embodiment, the driving circuit board may include a second opening part exposing the sensor part, and the driving circuit board may surround the auxiliary board in a plan view.

In an embodiment, the display device may further include a first adhesive layer disposed between the base substrate and the main board, and a cushion layer disposed between the main board and the driving circuit board.

In an embodiment, the cushion layer may include a third opening part exposing the first opening part, and an area of the third opening part may be larger than the area of the first opening part.

In an embodiment, the display device may further include a second adhesive layer disposed between the main board and the auxiliary board to surround the auxiliary board, wherein the second adhesive layer does not overlap the first opening part and overlaps the second opening part in a plan view.

In an embodiment, the area of the auxiliary board may be larger than the area of the first opening part to completely cover the first opening part in a plan view.

In an embodiment, the sensor part may overlap the display area.

In an embodiment, the sensor part may overlap a boundary between the display area and the non-display area.

In an embodiment, the sensor part may be a fingerprint recognition sensor.

In an embodiment, the display device may further include an encapsulation layer disposed on the display element layer, and an input sensor part disposed on the encapsulation layer.

In an embodiments of the inventive concept, a portable device includes: a display device; and a touch pen configured to select information displayed on the display device, wherein the display device includes: a display panel including a display area and a non-display area adjacent to the display area; an input sensor part disposed on an upper portion of the display panel; a sensor part disposed on a lower portion of the display panel and overlapping the display area; and a sensing circuit board including: a main board configured to generate an electric field in response to an input by the touch pen, disposed on the lower portion of the base substrate, and including a first opening part overlapping the sensor part; and an auxiliary board overlapping the sensor part, disposed on the main board, and electrically connected to the main board.

In an embodiment, the area of the auxiliary board may be larger than the area of the first opening part in a plan view.

In an embodiment, the sensor part may include a fingerprint recognition sensor disposed in the first opening part, and a package encapsulating the fingerprint recognition sensor.

In an embodiment, the display device may further include an adhesive layer disposed between the display panel and the main board, and a cushion layer disposed on the main board and including a second opening part exposing the sensor part, wherein, an area of the auxiliary board is smaller than the area of the second opening part.

BRIEF DESCRIPTION OF DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
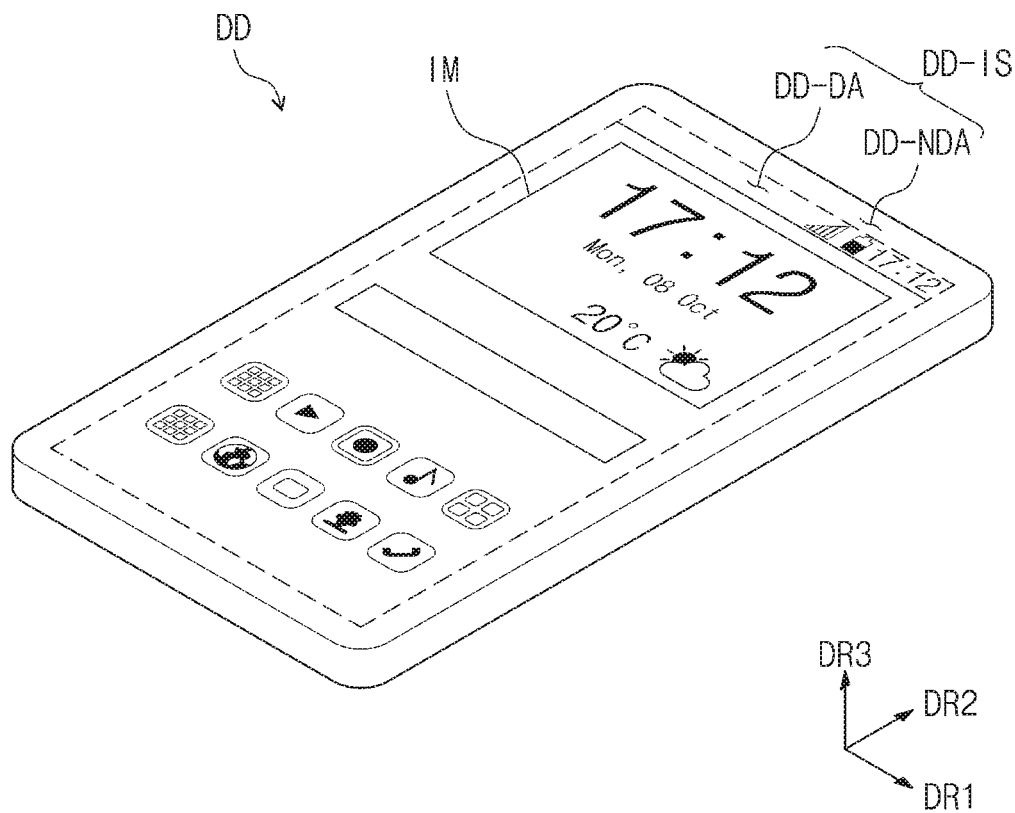
FIG. 1 is a perspective view of a display device according to an embodiment of the inventive concept.

It will be understood that when an element or layer is referred to as being "on", "connected to" or "coupled to" another element or layer, it can be directly on, connected or coupled to the other element or intervening third elements may be present.

Like reference numerals in the drawings refer to like elements. In addition, in the drawings, the thickness and the ratio and the dimension of the element are exaggerated for effective description of the technical contents.

The term "and/or" includes any and all combinations of one or more of the associated items.

Terms such as first, second, and the like may be used to describe various components, but these components should not be limited by the terms. The terms are used only for the purpose of distinguishing one component from another component. For instance, a first component may be referred to as a second component, or similarly, a second component may be referred to as a first component, without departing from the scope of the present invention. The singular forms "a," "an" and "the" are intended to include the plural forms as well, unless the context clearly indicates otherwise.

In addition, the terms such as "under", "lower", "on", and "upper" are used for explaining associations of items illustrated in the drawings. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Hereinafter, embodiments of the inventive concept will be described with reference to the accompanying drawings.

Figure 2:
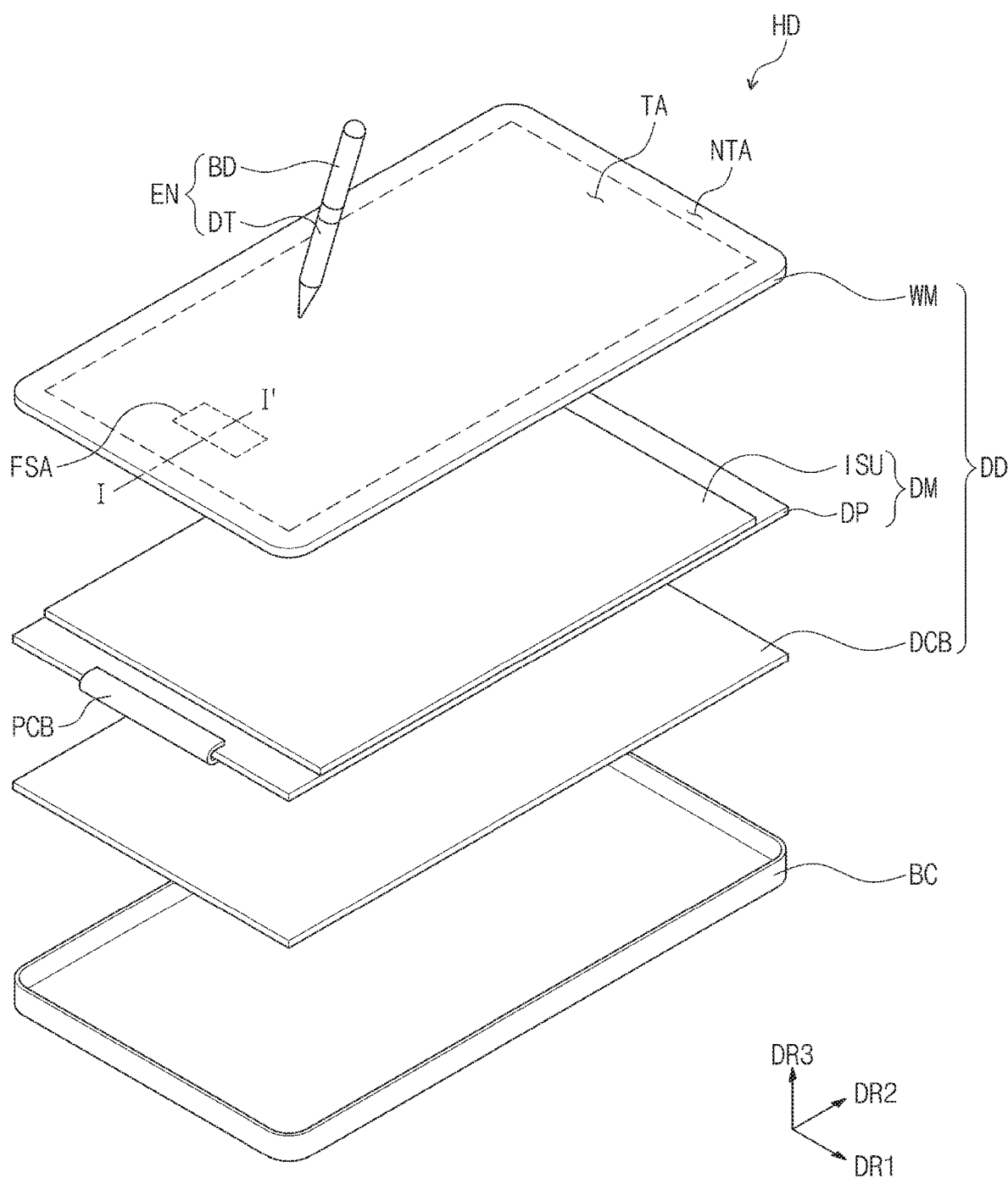
FIG. 2 is an exploded perspective view of a portable device according to an embodiment of the inventive concept.

FIG. 1 is a perspective view of a display device according to an embodiment of the inventive concept. FIG. 2 is an exploded perspective view of a portable device according to an embodiment of the inventive concept.

In relation to FIG. 1, the display device DD may display an image IM through a display area DD-DA on a display surface DD-IS. According to an embodiment of the inventive concept, the display device DD is illustrated as being provided with a plane type display surface DD-IS, but the inventive concept is not limited thereto. The display device DD may include a curved type display surface or a stereoscopic display surface. The stereoscopic display surface may include a plurality of display areas facing different directions, and include, for example, a polygonal columnar display surface.

The display device DD may be a flexible display device or a rigid display device. Although not illustrated, electronic modules, camera modules, power supply modules, and the like which are disposed on a main board are disposed in a case or the like together with the display device DD, and constitute a portable device. The display device DD in an embodiment of the inventive concept may be applied not only to a large electronic device such as a television or a monitor, but also to a small or medium electronic device such as a tablet, a vehicle navigator, a game player, a smart phone or a smart watch.

The display surface DD-IS may be parallel to a surface defined by a first direction DR1 and a second direction DR2. A direction normal to the display area DD-IS, namely, the thickness direction of the display device DD is indicated by a third direction DR3. In the present specification, the expression of "in a plan view, or when viewed in a plan view" may mean when viewed from the third direction DR3. A front surface (or an upper surface) and a rear surface (or a lower surface) of each member or each unit to be described below are distinguished by the third direction DR3. However, the first to third directions DR1, DR2, and DR3 illustrated in the embodiment are just exemplary, and the directions indicated by the first to third directions DR1, DR2, and DR3 may mean the reverse directions.

As illustrated in FIG. 1, the display surface DD-IS includes a display area DD-DA on which the image IM is displayed and a non-display area DD-NDA adjacent to the display area DD-DA to surround the display area DD-DA. The non-display area DD-NDA is an area on which the image is not displayed. FIG. 1 illustrates application icons and a watch widget as an example of the image IM.

In addition, the display area DD-DA has a rectangular shape and is surrounded by the non-display area DD-NDA. However, the embodiment of the inventive concept is not limited thereto, and the shape of the display area DD-DA and the shape of the non-display area DD-NDA may be designed corresponding to a configuration of the display device DD. For example the non-display area DD-NDA may be disposed adjacent to only any one side of the display area DD-DA, or may be omitted.

Referring to FIG. 2, the portable device HD includes the display device DD and an input device for example, an electronic module EN. The display device DD and the electronic module EN may interact and work together to generate an input signal. For example, the electronic module EN may be a touch pen and be used as an input device which selects information displayed on the display device DD. The display device DD may display information selected by the electronic module EN.

In detail, the display device DD includes a window WM, a display module DM, a sensing circuit board DCB, a driving circuit board PCB, and a bottom chassis BC.

The window WM is disposed on an upper portion of the display module DM and may transmit an image provided from the display module DM through a transmission area TA. In detail, the window WM includes the transmission area TA and a non-transmission area NTA. The transmission area TA may overlap the display area DD-DA and have the shape corresponding to the display area DD-DA. The image IM displayed in the display area DD-DA of the display device DD may be visually recognized by a user through the transmission area TA of the window WM.

The non-transmission area NTA may overlap the non-display area DD-NDA and have the shape corresponding to the non-display area DD-NDA. The non-transmission area NTA may have a relatively low optical transmittance in comparison to the transmission area TA. However, the technical spirit of the inventive concept is not limited thereto, and the non-transmission area NTA may be omitted.

The window WM may be formed of glass, sapphire, or plastic, etc. Although the window WM is shown to have a single layer, the window WM may include a plurality of layers. The window WM may include a base layer which overlaps with the transmission are TA and the non-transmission area NTA. The window WM may include at least one printing layer disposed on a rear surface of the base layer to overlap the non-transmission area NTA. The printing layer may have a prescribed color. For example, the printing layer may be provided with a black color, or a color other than the black color.

According to the embodiments of the inventive concept, the transmission area TA may include a sensing area FSA. The sensing area FSA may overlap the transmission area TA and be an area for recognizing a fingerprint.

When the sensing area FSA is disposed on the non-transmission area NTA, the area of the non-transmission area NTA may be enlarged as large as the area of the sensing area FSA. However, as the display device DD of the embodiment of the inventive concept has the structure in which the sensing area FSA overlaps the display area DD-DA, the area of the non-transmission area NTA may be reduced. As a result, the transmission area TA may be enlarged.

On the other hand, the sensor part overlapping the sensing area FSA may be disposed on the rear surface of the display module DM. A description thereabout will be provided later.

The electronic module EN may directly contact or come close to the surface of the window WM and select information displayed on the surface of the window WM. Here, the contact may include both cases in which two objects directly touch and come close. For example, the electronic module EN according to the embodiment of the inventive concept may be provided as a touch pen. The electronic module EN may include a body part BD and a sensing part DT connected to one ends of the body part BD. Although not illustrated, the body part BD may include a power supply and provide power to the sensing part DT of the electronic module EN. The sensing part DT may correspond to a typical point pen and be provided with a metal which is a conductive material. The sensing part DT may generate an electric field with the sensing circuit board DCB in response to the power provided from the body part BD.

The display module DM is disposed between the window WM and the bottom chassis BC. The display module DM includes a display panel and an input sensor part ISU.

The display panel DP may generate an image and the generated image is transmitted to outside through the window WM. According to an embodiment of the inventive concept, the display panel DP may be an organic light emitting display panel, a liquid crystal display panel, or a quantum dot light emitting display panel, but the display panel DP is not particularly limited. The organic light emitting display panel includes organic light emitting elements. The liquid crystal panel includes liquid crystal molecules. The quantum dot light emitting display panel includes quantum dots or quantum rods.

Hereinafter, the display panel DP according to an embodiment of the inventive concept will be described as the organic light emitting display panel. However, the technical spirit of the inventive concept is not limited thereto, and various display panels may be applied to the inventive concept.

The input sensor part ISU may be disposed between the window WM and the display panel DP. The input sensor part ISU senses an input from the outside of the display device DD. The input may have various types. For example, the input may include various types of external inputs such as from the user's body, light, heat, or pressure. In addition, not only an input generated from a contact of a part of the body such as a user's finger, but also an input from a touch of a proximal or adjacent space (for example, hovering) may be one type of the input.

The input sensor part ISU may be directly disposed on the display panel DP. The input sensor part ISU in the present embodiment may be manufactured with the display panel DP through the same process as the display panel DP. However, the technical spirit of the inventive concept is not limited thereto, and the input sensor part ISU may be prepared as a separate panel and be combined with the display panel DP through an adhesive layer.

The sensing circuit board DCB may be disposed in a lower portion of the display module DM. The sensing circuit board DCB may sense an input applied from the electronic module EN. For example, the sensing circuit board DCB may receive position information selected by the electronic module EN or recognize a movement of the electronic module EN. The sensing circuit board DCB may convert the information received from the electronic module EN to a digital signal, and deliver the digital signal to the display panel DP. For example the sensing circuit board DCB may be a digitizer.

The bottom chassis BC may be combined with the window WM. The bottom chassis BC provides the rear surface of the display device DD and is combined with the window WM to define an internal space. The bottom chassis BC may include a material having relatively strong hardness. For example, the bottom chassis BC may include a plurality of frames and/or plates which include glass, plastic, or a metal. The bottom chassis BC may stably protect components of the display device DD contained in the internal space from an external shock.

In addition, although the bottom chassis BC is described to include the material having the strong hardness, but the embodiment of the inventive concept is not limited thereto. The bottom chassis BC may include a flexible material. Although not illustrated, when the display device DD according an embodiment of the inventive concept is a flexible display, components included in the display device DD may also have flexible property.

Figure 3A:
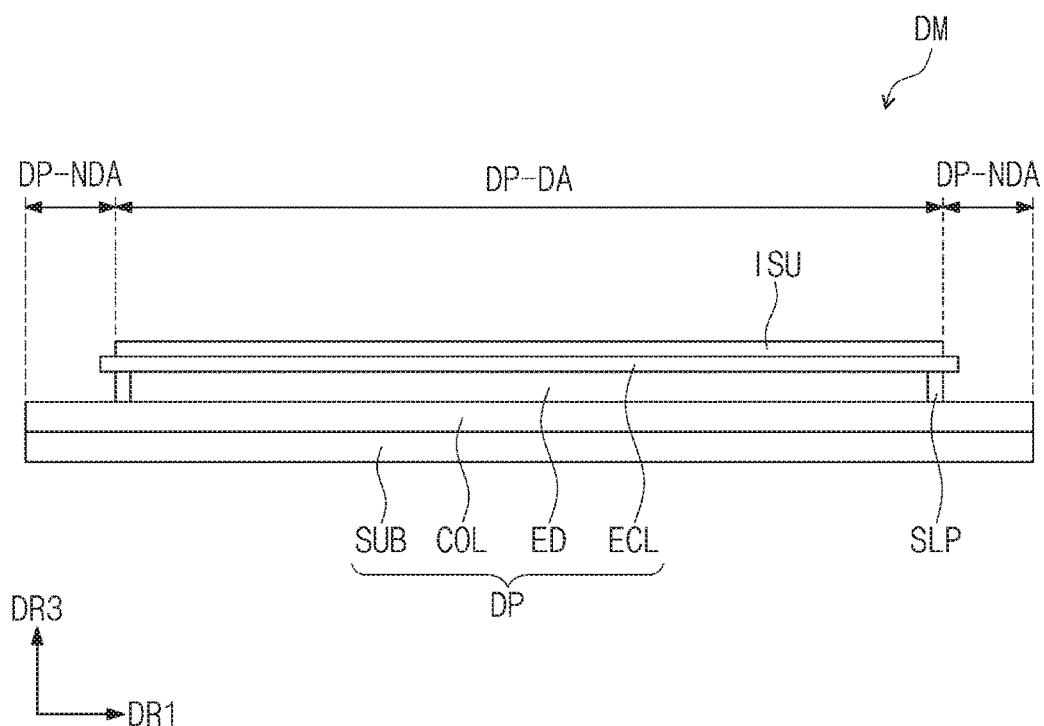
FIG. 3A is a cross-sectional view of a display module according to an embodiment of the inventive concept.
Figure 3B:
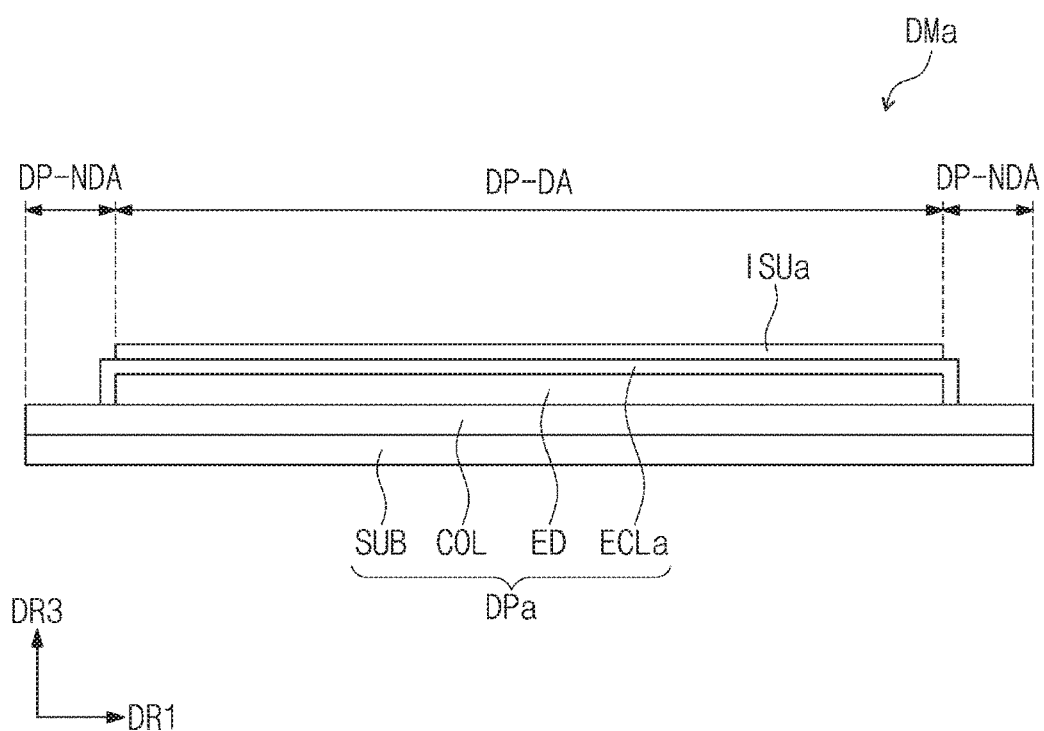
FIG. 3B is a cross-sectional view of a display module according to another embodiment of the inventive concept.

FIG. 3A is a cross-sectional view of a display module according to an embodiment of the inventive concept. FIG. 3B is a cross-sectional view of a display module according to another embodiment of the inventive concept.

Referring to FIG. 3A, the display module DM according to the embodiment of the inventive concept will be described. The display module DM may include the display panel DP and the input sensor part ISU described with reference to FIG. 2.

The display panel DP includes a base substrate SUB, a circuit element layer COL, a display element layer ED, and an insulation layer ECL. The display panel DP includes a display area DP-DA and a non-display area DP-NDA. The display area DP-DA and the non-display area DP-NDA of the display panel DP may overlap the display area DD-DA and the non-display area DD-NDA of the display device DD aforementioned with reference to FIG. 1. The non-display area DP-NDA may be disposed only adjacent to one side of the display area DP-DA or omitted.

The base substrate SUB may generally support the components of the display panel DP and the input sensor part ISU, and include a flexible material. For example, the base substrate SUB may include a plastic substrate, a glass substrate, an organic/inorganic composite substrate, or the like. Alternatively, the base substrate SUB may have a laminated structure including a plurality of insulation layers. The plastic substrate may include at least one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide resin, and a parylene-based resin.

The circuit element layer COL may include a plurality of insulation layers, a plurality of conductive layers, and a semiconductor layer. The plurality of conductive layers of the circuit element layer COL may be signal wirings or control lines of a pixel.

The display element layer ED overlaps the display area DP-DA and is disposed on the base substrate SUB. The display element layer ED includes a display element, for example, an organic light emitting diode. However, the embodiment of the inventive concept is not limited thereto, and according to the types of the display panel DP, the display element layer ED may include a liquid crystal device, inorganic light emitting diodes, or organic-inorganic hybrid light emitting diodes.

The insulation layer ECL encapsulates the display element layer ED. For example, the insulation layer ECL may overlap each of the display area DP-DA and the non-display area DP-NDA. However, the insulation layer ECL may not overlap the non-display area DP-NDA.

According to FIG. 3A, the insulation layer ECL may be an encapsulation substrate. The insulation layer ECL protects the display element layer ED from a foreign material such as moisture, oxygen and a dust particle. The insulation layer ECL may be combined with the base substrate SUB through a sealant SLP. The sealant SLP may include a frit. However, this is just exemplary, and a material forming the sealant SLP is not limited thereto.

The input sensor part ISU may overlap the display area DP-DA and be disposed on the insulation layer ECL. On the other hand, FIG. 3A illustrates, as an example, that the input sensor part ISU is directly provided on the insulation layer ECL through successive processes, but the embodiment of the inventive concept is not limited thereto. For example, an adhesive layer (not shown) may be provided between the input sensor ISU and the insulation layer ECL, and the input sensor part ISU and the insulation layer ECL may be adhesively attached to each other by the adhesive layer.

Referring to FIG. 3B, a display module DMa may include a display panel DPa and an input sensor part ISUa. In comparison with the display module DM shown in FIG. 3A, the display module DMa illustrated in FIG. 3B is different only in the configuration of the insulation layer ECLa, and the remaining configurations may be substantially the same.

The display panel DPa includes the base substrate SUB, the circuit element layer COL, the display element layer ED, and the insulation layer ECLa.

The insulation layer ECLa may completely encapsulate the display element layer ED. The insulation layer ECLa may cover a top surface and side surfaces of the display element layer ED not to expose the display element layer ED to outside. For example, the insulation layer ECLa may overlap each of the display area DP-DA and the non-display area DP-NDA. However, according to another embodiment of the inventive concept, the insulation layer ECLa may not overlap the non-display area DP-NDA. The insulation layer ECLa according to the embodiment of the inventive concept may include at least one encapsulation organic layer and at least one encapsulation inorganic layer.

The encapsulation inorganic layer protects the display element layer ED from moisture and oxygen, and the encapsulation organic layer protects the display element layer ED from a foreign material such as a dust particle. The encapsulation inorganic film may include a silicon nitride layer, a silicon oxy-nitride layer, and a silicon oxide layer, a titanium oxide layer, an aluminum oxide layer, or the like, but the material forming the encapsulation inorganic film is not particularly limited thereto. The encapsulation organic film may include an acrylic-based inorganic layer, but the material forming the encapsulation organic film is not limited thereto.

The input sensor part ISUa may be directly provided on the insulation layer ECLa through successive processes. However, the embodiment of the inventive concept is not limited thereto, and the input sensor part ISUa may be adhesively attached to the insulation layer ECLa through an adhesive layer. In this case, the input sensor part ISUa may include a base layer and a sensing circuit element layer. The sensing circuit element layer may include a plurality of insulation layers and a plurality of conductive layers.

Figure 4:
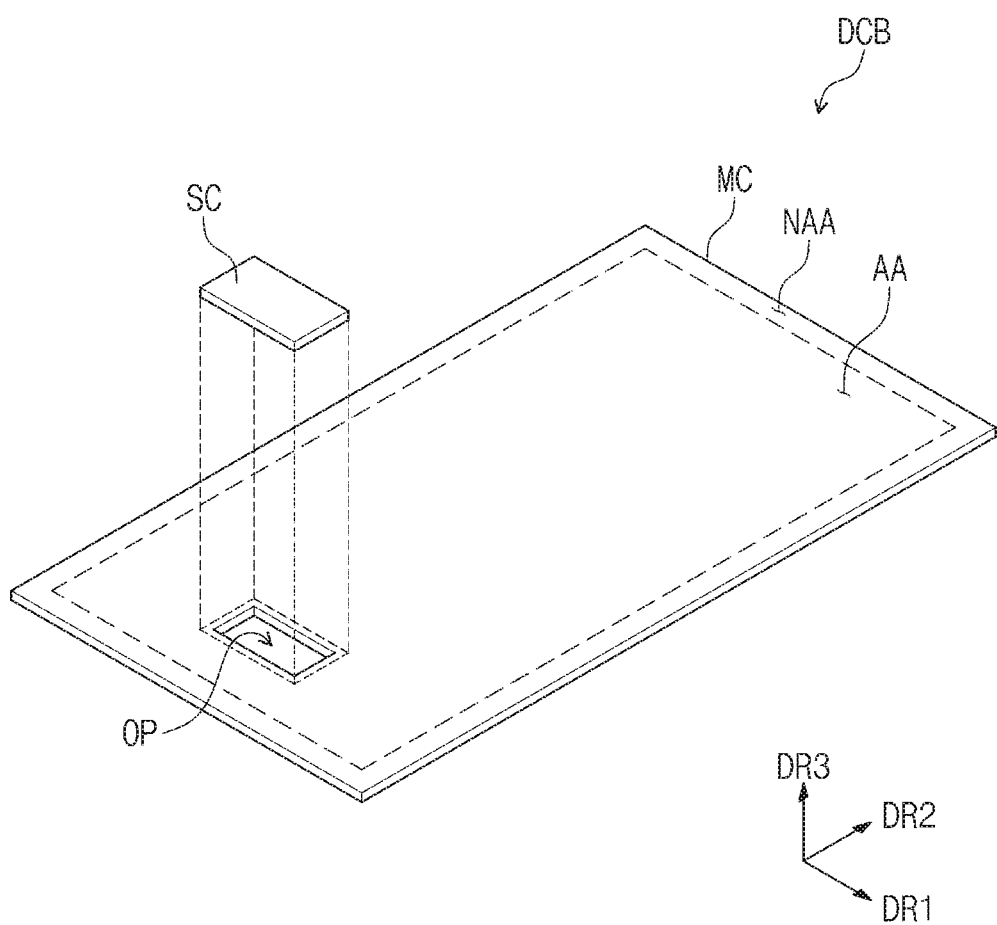
FIG. 4 is an exploded perspective view of a sensing circuit board according to an embodiment of the inventive concept.
Figure 5:
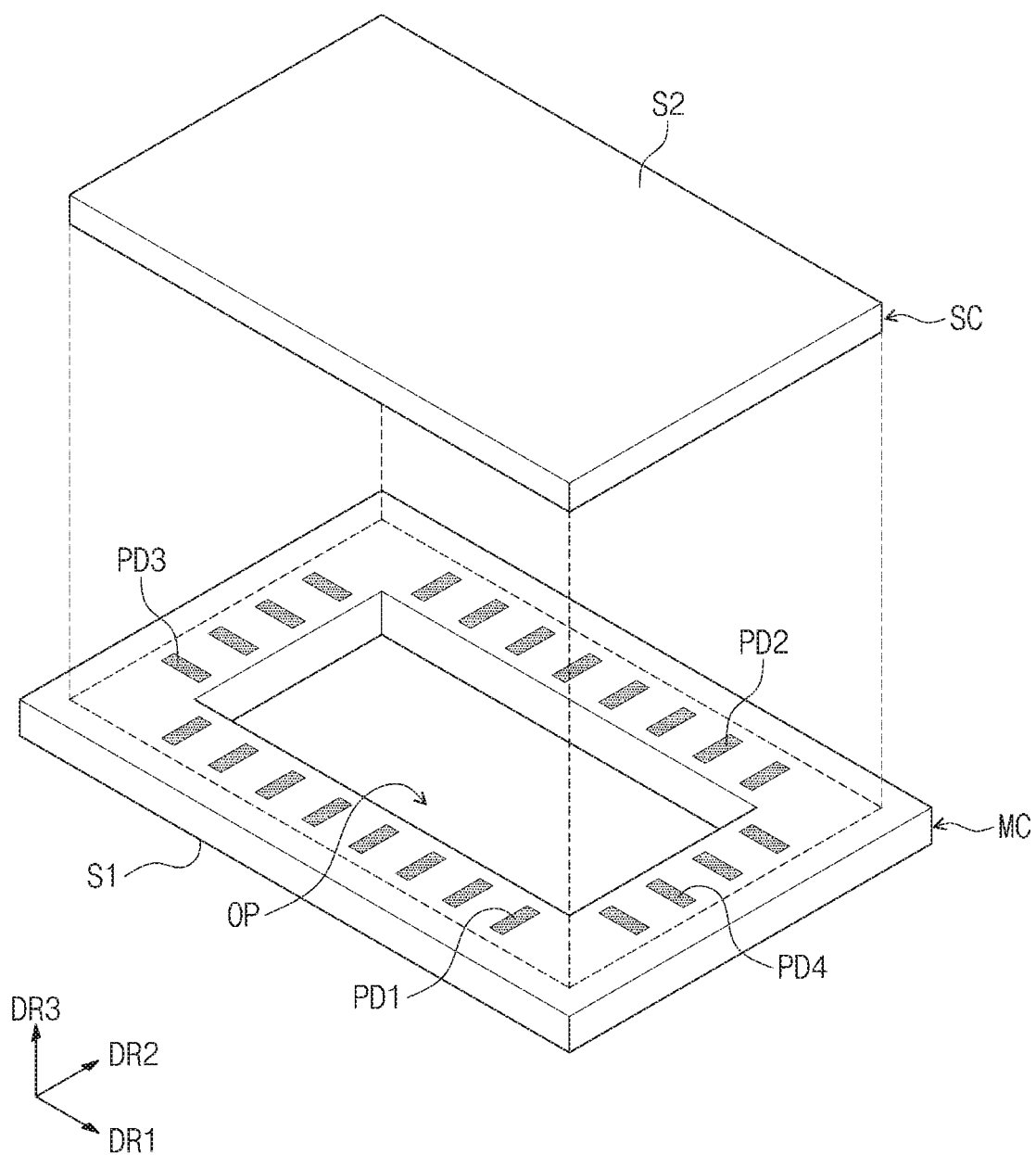
FIG. 5 is an exploded perspective view showing a part of the sensing circuit board according to an embodiment of the inventive concept.

FIG. 4 is an exploded perspective view of a sensing circuit board according to an embodiment of the inventive concept. FIG. 5 is an exploded perspective view showing a part of the sensing circuit board according to an embodiment of the inventive concept.

Referring to FIG. 4, the sensing circuit board DCB includes a main board MC and an auxiliary board SC. According to the inventive concept, each of the main board MC and the auxiliary board SC may generate an electric field with the electronic module EN.

In detail, the main substrate may include an activation area AA and a non-activation area NAA. The activation area AA of the main board MC may correspond to the display area DD-DA of the display device DD illustrated in FIG. 1 and the transmission area TA of the window WM illustrated in FIG. 2. The non-activation area NAA of the main board MC may correspond to the non-display area DD-NDA of the display device DD illustrated in FIG. 1 and the non-transmission area TA of the window WM illustrated in FIG. 2.

According to an embodiment of the inventive concept, the main board MC may include an opening part OP overlapping the sensing area FSA illustrated in FIG. 2. As described above, because a sensor for fingerprint recognition overlaps the sensing area FSA and is disposed in the rear surface of the display panel DP, an opening part OP may be provided in the main board for a space for arranging the sensor.

On the other hand, in an area overlapping the opening part OP, an electric field may not be provided between the sensing circuit board DCB and the electronic module EN because the main board MC is not disposed in the opening part OP. However, according to an embodiment of the inventive concept, the auxiliary board SC may overlap the opening part OP to completely cover the opening part OP in a plan view and be electrically connected to the main board MC. In other words, in a plan view, the area of the auxiliary board SC is provided larger than that of the opening part OP, and a part of the auxiliary board SC may be bonded onto a part of the main board MC surrounding the opening part OP. As a result, an electric field may be generated between the sensing circuit board DCB which includes the auxiliary board SC and the electronic module EN across the entire activation area AA.

In detail, referring to FIG. 5, the main board MC includes a first portion S1 surrounding the opening part OP, a plurality of main pads PD1, PD2, PD3, and PD4, and a plurality of main signal lines (not shown) respectively connected to the corresponding plurality of main pads PD1, PD2, PD3, and PD4.

First main pads PD1 and Second main pads PD2 are disposed on the first portion S1, and may be separated with the opening part OP interposed therebetween in one direction. Here, the one direction may be the second direction DR2. Each of the first main pads PD1 and the second main pads PD2 may be arranged along the first direction DR1. For example, the first main pads PD1 may extend along the second direction DR2 and electrically connected to the plurality of first main signal lines disposed in the main board MC and extending along the second direction DR2, respectively. The second main pads PD2 may extend along the second direction DR2 and electrically connected to the plurality of second main signal lines disposed in the main board MC and extending along the second direction DR2, respectively.

Third main pads PD3 and Fourth main pads PD4 may be disposed on the first portion S1, and may be separated with the opening part OP interposed therebetween in another direction that is perpendicular to the one direction. Here, the other direction may be the first direction DR1. The third main pads PD3 and the fourth main pads PD4 may be arranged along the second direction DR2. For example, the third main pads PD3 may extend along the first direction DR1 and electrically connected to the plurality of third main signal lines disposed in the main board MC and extending along the first direction DR1, respectively. The fourth main pads PD4 may extend along the first direction DR1 and electrically connected to the plurality of fourth main signal lines disposed in the main board MC and extending along the first direction DR1, respectively.

The auxiliary board SC includes a second board S2, a plurality of auxiliary pads and a plurality of auxiliary signal lines disposed on the second board S2. The auxiliary pads disposed on the second board S2 may face the main pads PD1, PD2, PD3, and PD4 disposed on the first portion S1.

Although not illustrated separately, the auxiliary pads include the plurality of first to fourth auxiliary pads respectively connected to the first to fourth main pads PD1, PD2, PD3, and PD4, respectively.

The first main pads PD1 are electrically connected to the first auxiliary pads, and the second main pads PD2 are electrically connected to the second auxiliary pads. In particular, the first auxiliary pads and the second auxiliary pads may be electrically connected to each other through the first auxiliary signal lines, respectively. One ends of the first auxiliary signal lines are electrically connected to the respective first auxiliary pads, and the other ends of the first auxiliary signal lines are electrically bonded to the respective second auxiliary pads.

Accordingly, sensing signals transferred from the first main pads PD1 may be transferred to the second main pads PD2 through the first auxiliary pads, the first auxiliary signal lines and the second auxiliary pads. Hereinafter, the sensing signal according to the embodiment of the inventive concept may be a signal provided to the sensing circuit board DCB in order to generate the electrical field with the external electronic module EN.

In addition, the third main pads PD3 are electrically connected to the third auxiliary pads, and the fourth main pads PD4 are electrically connected to the fourth auxiliary pads. In particular, the third auxiliary pads and the fourth auxiliary pads may be electrically connected to each other through the second auxiliary signal lines insulated from the first auxiliary signal lines, respectively. One ends of the second auxiliary signal lines are electrically connected to the respective third auxiliary pads and the other ends of the second auxiliary signal lines are electrically connected to the respective fourth auxiliary pads.

Accordingly, the sensing signals transferred from the third main pads PD3 may be transferred to the fourth main pads PD4 through the third auxiliary pads, the second auxiliary signal lines and the fourth auxiliary pads.

As described above, the opening part OP is provided in order to provide a space to accommodate a fingerprint recognition sensor to the main board MC of the sensing circuit boards DCB according to the embodiment of the inventive concept, but the auxiliary board SC overlapping the opening part OP may be electrically connected to the main board MC. As a result, the plurality of main signal lines (not shown) may not be disconnected in the opening part OP thus reliability of sensing a touch of the electronic module EN may be generally improved.

Figure 6:
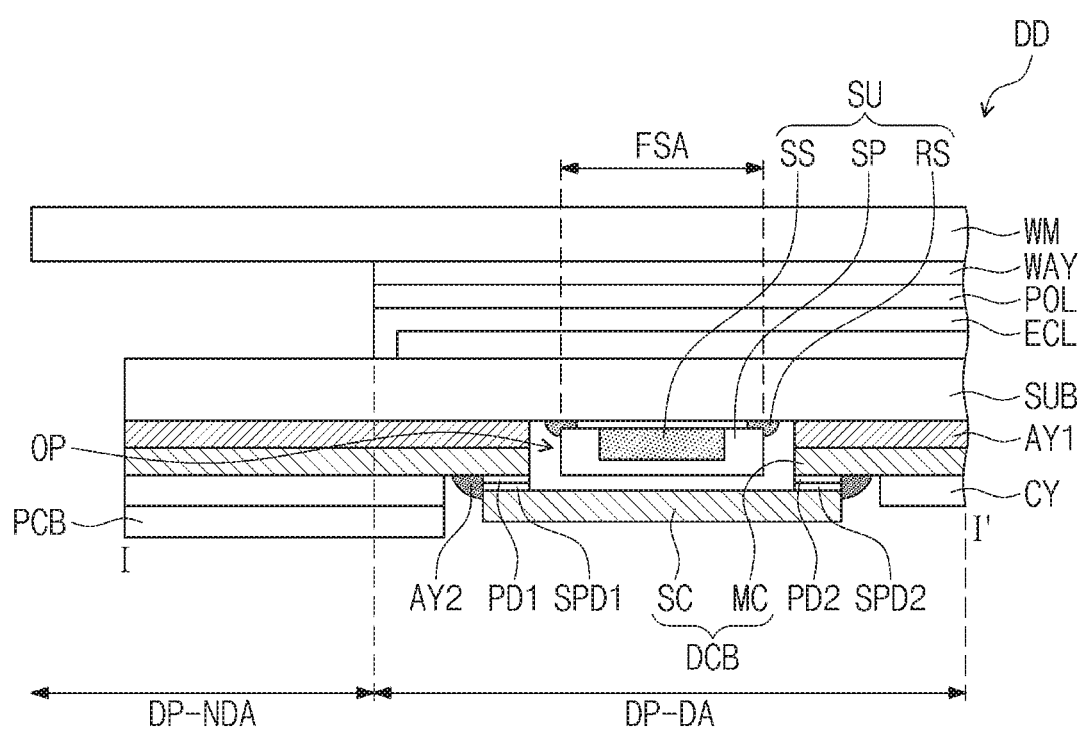
FIG. 6 is a sectional view cut along I-I' illustrated in FIG. 2 according to an embodiment of the inventive concept.

FIG. 6 is a sectional view cut along I-I' illustrated in FIG. 2 according to an embodiment of the inventive concept. FIG.

7 is a plan view showing a rear surface of a display device according to an embodiment of the inventive concept.

In comparison with the display device DD illustrated in FIG. 2, a display device DD illustrated in FIG. 6 further includes a polarization layer POL, a window adhesive layer WAY, a sensor part SU, a cushion layer CY, a first adhesive layer AY1, and a second adhesive layer AY2. In addition, according to the embodiment of the inventive concept, the sensor part SU may entirely overlap the display area DP-DA.

The polarization layer POL is disposed between the display module DM and the window WM. The polarization layer POL may prevent circuit elements included in the display module DM from being visually recognized externally by polarizing external light incident through the window WM. According to the embodiment, the polarization layer POL may be omitted. The window adhesive layer WAY is disposed between the polarization layer POL and the window WM to attach the polarization layer POL and the window WM to each other. For example, the window adhesive layer WAY may be provided with an optically clear adhesive film, an optically clear resin, or a pressure sensitive adhesive film.

On the other hand, as described with reference to FIG. 2, the sensing area FSA configured to recognize an external fingerprint may overlap the display area DP-DA. However, the technical spirit of the inventive concept is not limited thereto, and the sensing area FSA may overlap a part of the non-display area DP-NDA. A detailed description thereabout will be provided with reference to FIG. 8.

The sensor part SU may overlap the sensing area FSA and be disposed on the rear surface of the base substrate SUB. The sensor part SU may include a sensor SS, a package encapsulating the sensor SS, and an adhesive RS configured to attach the package SP to the base substrate SUB.

According to an embodiment of the inventive concept, the sensor SS may be provided as a fingerprint recognition sensor and the fingerprint recognition sensor may be operated on the basis of an optical, ultrasonic, or capacitive manner. However, the sensor SS is described as the fingerprint recognition sensor, but the embodiment of the inventive concept is not limited thereto. In other words, the sensor DD may be variously provided including a camera, a pressure sensor, a proximity sensor, a luminance sensor, a temperature sensor, or the like, which is disposed in a lower portion of the base substrate SUB.

Hereinafter, the sensor part SU according to the embodiment illustrated in FIG. 6 will be described as a fingerprint recognition sensor operated based on an optical manner. The fingerprint recognition sensor operated based on an optical manner may be operated based on a technology for sensing light reflected by a fingerprint to recognize the fingerprint, after the light is irradiated to the fingerprint.

The package SP may encapsulate the sensor SS which faces the base substrate SUB, mounted therein, and transfer a signal sensed from the sensor SS to the driving circuit board PCB. Although not illustrated, the package SP may include a control circuit electrically connected to the driving circuit substrate PCB and the sensor SS.

The adhesive RS may attach the sensor part SU to the substrate SUB. For example, the adhesive RS may be disposed on the rear surface of the base substrate SUB to surround the sensor SS in a plan view.

The sensing circuit board DCB may include the auxiliary board SC and the main board MC. The main board MC may include the opening part OP. The auxiliary board SC may overlap the opening part OP and be disposed on the main board MC. According to an embodiment of the inventive concept, the sensor part SU may be provided in an internal space defined by the opening part OP. Here, the internal space may be a space defined by the main board MC, the auxiliary board SC and the base substrate SUB.

In particular, the distance from the base substrate SUB to an upper surface of the main board MC in the third direction DR3, which is the thickness direction, may be shorter than the distance from the base substrate SUB to a lower surface of the auxiliary board SC. In other words, the main board MC and the auxiliary board SC may be disposed on different layers.

According to FIG. 6, the first main pad PD1 and the second main pad PD2 disposed on the main board MC may be electrically connected to the first auxiliary pad SPD1 and the second auxiliary pad SPD2 disposed on the auxiliary board SC.

As described above, due to the auxiliary board SC which overlaps the opening part OP and electrically connected to the main board MC, an electric field may be generated even in the opening part OP.

The first adhesive layer AY1 may be disposed between the base substrate SUB and the main board MC. The first adhesive layer AY1 may also include an opening part corresponding to the opening part OP in the main board MC. The shape of the opening part included in the first adhesive layer AY1 may be substantially the same as that of the opening part OP in the main board MC. The first adhesive layer AY1 may be provided with an optically clear adhesive film, an optically clear resin, or a pressure sensitive adhesive film.

A second adhesive layer AY2 may attach the main board MC and the auxiliary boards SC to each other. For example, the second adhesive layer AY2 may surround the auxiliary board SC in a plan view to attach the main board MC and the auxiliary board SC to each other. The second adhesive layer AY2 may not overlap the opening part of the main board MC, but may overlap an opening part included in a cushion layer CY disposed on the main board MC.

The cushion layer CY may include the opening part overlapping the sensor part SU, and be disposed on the main board MC. In particular, in a plan view, the area of the opening part in the cushion layer CY may be larger than those of the opening part OP in the main board MC and an area of the auxiliary board SC. In addition, in a plan view, the cushion layer CY may provide accommodation space for the auxiliary board CY and may surround the auxiliary board SC, and the second adhesive layer AY2 may be disposed between the cushion layer CY and the auxiliary board SC.

The driving circuit board PCB may be disposed on the cushion layer CY. In other words, the cushion layer CY may be disposed between the main board MC and the driving circuit board PCB. For example, in a plan view, the driving circuit board PCB may not completely surround the auxiliary board SC and be provided adjacent to one side of the auxiliary board SC.

In addition, although not shown, the input sensor part ISU (see FIG. 3A) may be disposed between the insulation layer ECL and the polarization layer POL.

Figure 7:
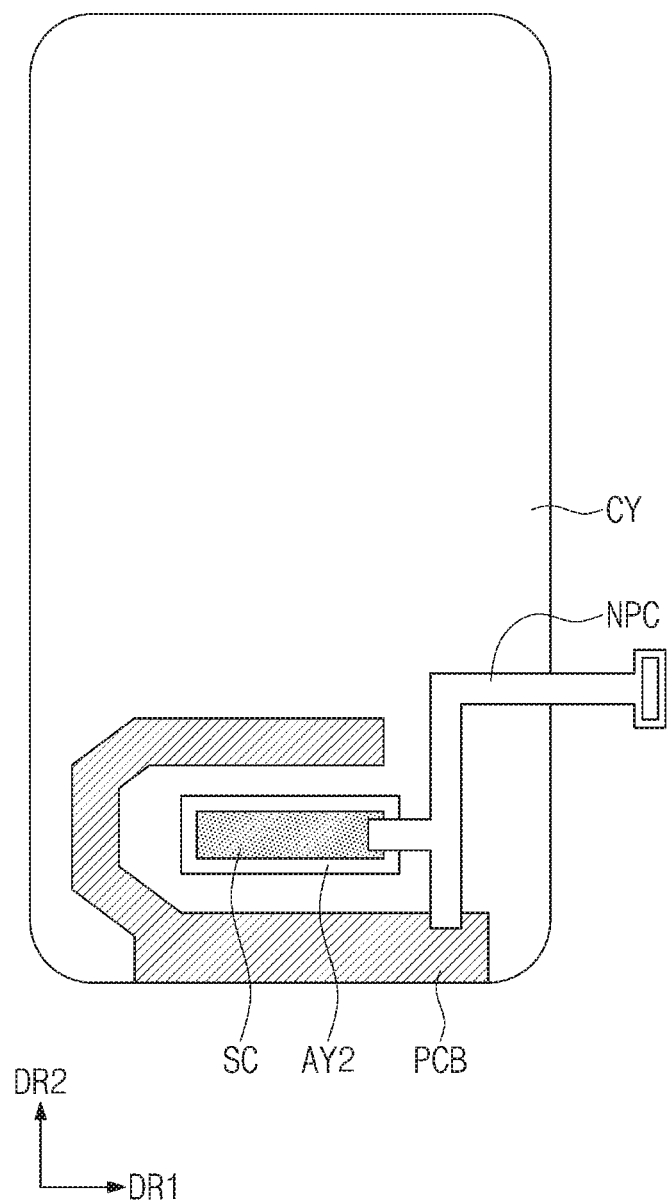
FIG. 7 is a plan view showing a rear surface of a display device according to an embodiment of the inventive concept.

FIG. 7 shows the rear surface of the display device DD, and the display device DD may further include a connector NPC electrically connected to the driving circuit board PCB.

The connector NPC may be disposed on the cushion layer CY and connected to the driving circuit board PCB and the auxiliary board SC. In particular, the connector NPC may be electrically connected to the driving circuit board PCB to provide sensing signals transferred externally to the driving circuit board PCB. Although not illustrated, the driving circuit board PCB may receive the sensing signals through the connector NPC, and transfer the sensing signals to the main board MC.

According to an embodiment of the inventive concept, the connector NCP and the auxiliary board SC may be provided in the integrated shape. In other words, the connector NPC and the auxiliary board SC may be provided as the integrated shape, and provided on the rear surface of the base substrate SUB. However, the embodiment of the inventive concept is not limited thereto, and the connector NPC may be provided separately that is not connected to the auxiliary board SC. In this case, the connector NPC may be electrically connected to the driving circuit board PCB through additional wirings.

Figure 8:
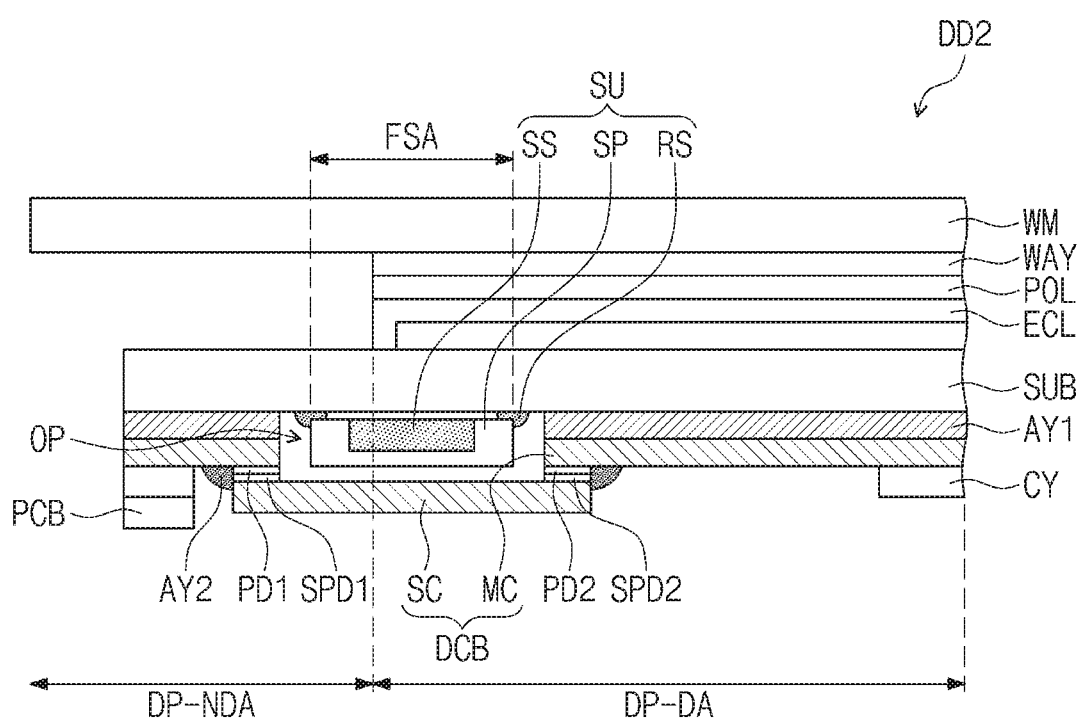
FIG. 8 is a sectional view cut along I-I' illustrated in FIG. 2 according to another embodiment of the inventive concept.

FIG. 8 is a sectional view cut along I-I' shown in FIG. 2 according to another embodiment of the inventive concept.

In comparison with the display device DD illustrated in FIG. 6, the display device DD2 illustrated in FIG. 8 is different only in the position of the sensor part SU, and the remaining configurations and structures may be substantially the same.

According to an embodiment of the inventive concept, the sensor part SU illustrated in FIG. 8 may be provided in an area overlapping the display area DP-DA and the non-display area DP-NDA. In other words, the sensor SS included in the sensor part SU may overlap each of the display area DP-DA and the non-display area DP-NDA adjacent to the display area DP-DA. As a result, the opening part OP included in the main board MC may also overlap a boundary between the display area DP-DA and the non-display area DP-NDA.

Figure 9:
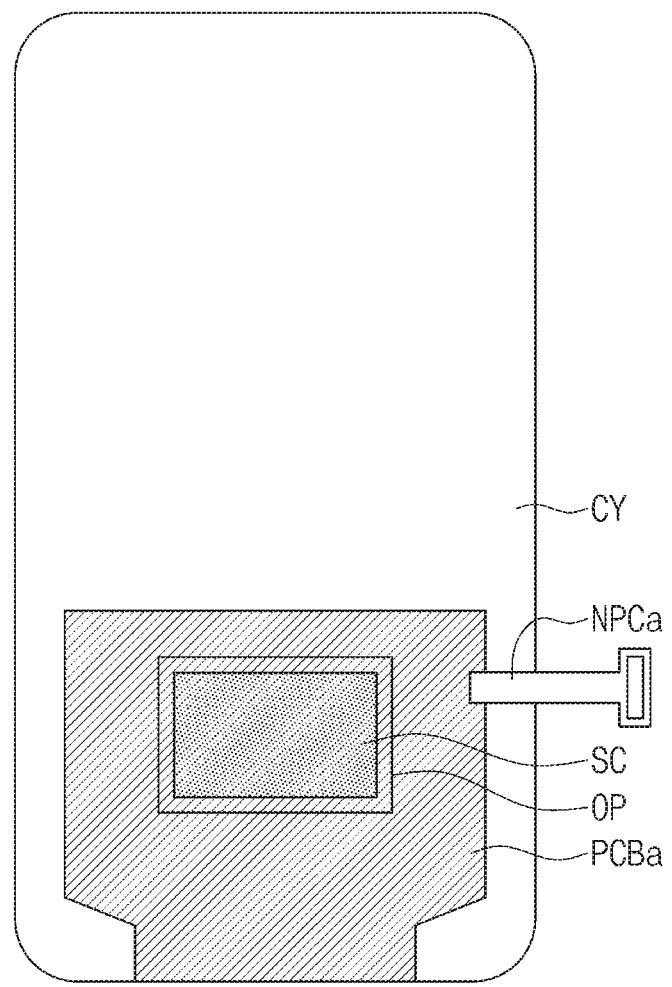
FIG. 9 is a plan view showing a rear surface of a display device according to another embodiment of the inventive concept.
Figure 10:
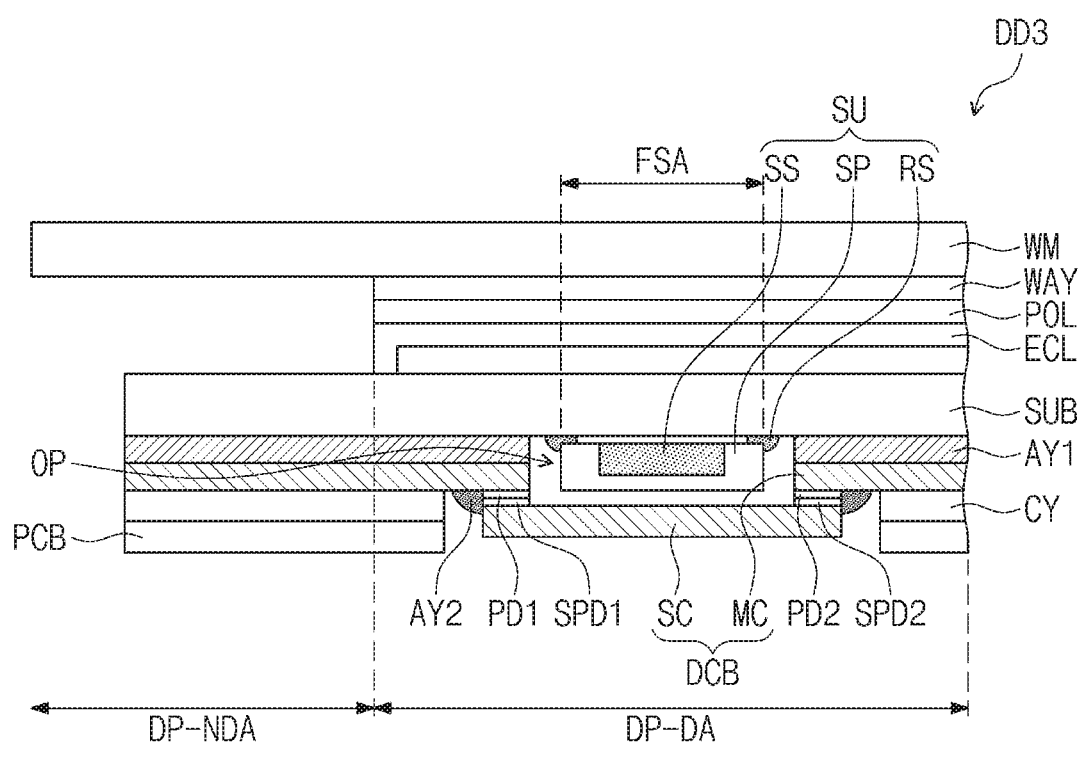
FIG. 10 is a cross-sectional view showing a part of the display device illustrated in FIG. 9.

FIG. 9 is a plan view showing a rear surface of a display device according to another embodiment of the inventive concept. FIG. 10 is a cross-sectional view showing a part of the display device illustrated in FIG. 9.

In comparison with the display device DD illustrated in FIG. 6, the display device DD3 illustrated in FIGS. 9 and 10 is different only in the structures of a driving circuit board PCBa and a connector NPCa, and the remaining configurations and structures may be substantially the same. Accordingly, the remaining configurations may be omitted for convenience of explanation.

Referring to FIGS. 9 and 10, the driving circuit board PCBa may include an opening part OPc configured to overlap the sensor part SU. In particular, in a plan view, the area of the opening part OPc of the driving circuit board PCBa may be larger than that of the opening part OP of the main board MC. In addition, in a plan view, the driving circuit board PCBa may completely surround the auxiliary board SC.

The connector NPCa may be connected to the driving circuit board PCBa. In other words, the connector NPCa may be provided separately that is not connected to the auxiliary board SC. In this case, sensing signals received externally may be transferred to the driving circuit board PCBa. The auxiliary board SC may receive the sensing signals through the driving circuit board PCBa and the main board MC.

According to the embodiments of the inventive concept, the sensor overlapping the display area and the sensing circuit board configured to sense an external electronic module may be disposed in the rear surface of the display panel. In particular, the sensing circuit board includes the main board including the opening part through which the sensor part is to be disposed and the auxiliary board covering the sensor part and electrically connected to the main board.

Accordingly, the sensing circuit board may generate an electric field with the external electronic module even in the opening part. As a result, reliability for sensing an input applied from the external electronic module can be improved.

As described above, the embodiments are disclosed in the drawings and the specification. Herein, specific terms have been used, but are just used for the purpose of describing the inventive concept and are not used for defining the meaning or limiting the scope of the inventive concept, which is disclosed in the appended claims. Thus it would be appreciated by those skilled in the art that various modifications and other equivalent embodiments can be made. Therefore, the true technical scope of the inventive concept shall be defined by the technical spirit of the appended claims.

What is claimed is:

1. A display device comprising:
   a base substrate comprising a display area and a non-display area adjacent to the display area;
   a display element layer disposed on an upper portion of the base substrate;
   a sensor part contacted on a lower portion of the base substrate; and
   a sensing circuit board disposed on the lower portion of the base substrate and generating an electric field in response to an input from outside, the sensing circuit board comprising:
      a main board comprising a first opening part exposing the sensor part, and
      an auxiliary board overlapping the sensor part, disposed on the main board and electrically connected to the main board.

2. The display device of claim 1,
   wherein a distance from the base substrate to an upper surface of the main board is shorter than a distance from the base substrate to a lower surface of the auxiliary board in a thickness direction of the base substrate.

3. The display device of claim 1,
   wherein the main board comprises a first portion which includes a first main pad and a second main pad disposed on the first portion and separated with the first opening part interposed therebetween in one direction, and
   the auxiliary board comprises a first auxiliary pad and a second auxiliary pad disposed on the auxiliary board,
   wherein the first main pad is connected to the first auxiliary pad, and the second main pad is connected to the second auxiliary pad.

4. The display device of claim 3,
   wherein the main board further comprises a third main pad and a fourth main pad disposed on the first portion and separated with the first opening part interposed therebetween in another direction that is perpendicular to the one direction, and
   the auxiliary board comprises a third auxiliary pad and a fourth auxiliary pad disposed on the auxiliary board,
   wherein the third main pad is connected to the third auxiliary pad and the fourth main pad is connected to the fourth auxiliary pad.

5. The display device of claim 1, further comprising:
   a driving circuit board configured to provide a driving signal to the display element layer and disposed on the main board.

6. The display device of claim 5, further comprising:
   a connector disposed on the main board and connecting the driving circuit board and the auxiliary board, wherein the driving circuit board receives a sensing signal through the connector and transfers the sensing signal to the main board.

7. The display device of claim 6, wherein the auxiliary board and the connector are provided in an integrated shape.

8. The display device of claim 5, wherein the driving circuit board comprises a second opening part exposing the sensor part, and the driving circuit board surrounds the auxiliary board in a plan view.

9. The display device of claim 5, further comprising:
a first adhesive layer disposed between the base substrate and the main board; and
a cushion layer disposed between the main board and the driving circuit board.

10. The display device of claim 9, wherein the cushion layer comprises a third opening part exposing the first opening part, and an area of the third opening part is larger than an area of the first opening part.

11. The display device of claim 8, further comprising:
a second adhesive layer disposed between the main board and the auxiliary board to surround the auxiliary board,
wherein the second adhesive layer does not overlap the first opening part and overlaps the second opening part in a plan view.

12. The display device of claim 1, wherein an area of the auxiliary board is larger than an area of the first opening part to completely cover the first opening part in a plan view.

13. The display device of claim 1, wherein the sensor part overlaps the display area.

14. The display device of claim 1, wherein the sensor part overlaps a boundary between the display area and the non-display area.

15. The display device of claim 1, wherein the sensor part is a fingerprint recognition sensor.

16. The display device of claim 1, further comprising:
an encapsulation layer disposed on the display element layer; and
an input sensor part disposed on the encapsulation layer.

17. A portable device comprising:
a display device; and
a touch pen configured to select information displayed on the display device,
wherein the display device comprises:
a display panel comprising a display area and a non-display area adjacent to the display area, the display panel comprising:
a base substrate; and
a display element layer disposed on an upper portion of the base substrate;
an input sensor part disposed on an upper portion of the display panel;
a sensor part contacted on a lower portion of the base substrate; and
a sensing circuit board disposed on the lower portion of the base substrate, the sensing circuit board comprising:
a main board configured to generate an electric field in response to an input by the touch pen, disposed on the lower portion of the base substrate, and comprising a first opening part overlapping the sensor part; and
an auxiliary board overlapping the sensor part, disposed on the main board, and electrically connected to the main board.

18. The portable device of claim 17, wherein an area of the auxiliary board is larger than an area of the first opening part in a plan view.

19. The display device of claim 17, wherein the sensor part comprises:
a fingerprint recognition sensor disposed in the first opening part; and
a package encapsulating the fingerprint recognition sensor.

20. The display device of claim 17, further comprising:
an adhesive layer disposed between the display panel and the main board; and
a cushion layer disposed on the main board and comprising a second opening part exposing the sensor part,
wherein an area of the auxiliary board is smaller than an area of the second opening part.

* * * * *